Sept. 3, 1963            E. A. JENSEN            3,102,993

HIGH INTENSITY NAVIGATION LIGHT SYSTEM

Filed Aug. 2, 1961            4 Sheets-Sheet 1

Sept. 3, 1963   E. A. JENSEN   3,102,993
HIGH INTENSITY NAVIGATION LIGHT SYSTEM
Filed Aug. 2, 1961   4 Sheets-Sheet 3

United States Patent Office 3,102,993
Patented Sept. 3, 1963

3,102,993
HIGH INTENSITY NAVIGATION LIGHT SYSTEM
Evan A. Jensen, San Carlos, Calif., assignor to United Air Lines, Inc., Chicago, Ill., a corporation of Delaware
Filed Aug. 2, 1961, Ser. No. 128,887
19 Claims. (Cl. 340—25)

Aircraft navigation lighting can provide one of the most useful and necessary visual aids to the safe operation of modern aircraft.

This invention relates to a navigation light system and more particularly to high intensity light systems which are especially useful in high speed aircraft and which are adapted to employ new and unusually efficient oscillating light sources.

This invention relates to a navigation light system which performs the dual functions of warning other aircraft and providing information to said aircraft of approximate position, range, and direction of travel of the aircraft employing the system. Thus the instant system combines the long range conspicuity of an anti-collision light with color coded position lights, and thereby provides long range perception of direction or navigational information.

It is therefore an object of this invention to provide a lighting system which performs the function of both an anti-collision light and a position light system.

It is another object of this invention to provide a high intensity navigation light system having greatly improved aircraft warning characteristics.

It is another object of this invention to provide an improved high intensity lighting system for aircraft having increased vertical coverage as well as desired coverage through a predetermined horizontal angle.

It is a further object of this invention to provide an improved high intensity navigation lighting system which will be especially helpful in warning and advising the operators of aircraft when flying on non-collision courses.

It is still a further object of this invention to provide an improved high intensity navigation lighting system which produces a minimum amount of disturbance for passengers and crew personnel from halation and reflected light.

It is still another object of this invention to provide an improved oscillating light source having a unique system of light distribution employing a reflector assembly of unusual design.

Another object of this invention is the provision of an improved navigation lighting system which provides high intensity illumination from oscillating light sources, the lighting units being sufficiently compact for employment in wing tips and other restricted areas.

Further and additional objects of this invention will become manifest from a consideration of this description, the accompanying drawings and the appended claims.

In one form of this invention three oscillating light units employing an unusual construction including a sealed beam light source and a plurality of uniquely shaped reflectors are disposed respectively at each wing tip and in the tail assembly of an aircraft. Energization of the lights is controlled by the crew whereby the two wing tip lights are synchronized to oscillate through angles of approximately 116° overlapping the forward axis of the aircraft by approximately 3° while the oscillating tail light moves through an angle of substantially 146°, overlapping the span of each of the wing lights by approximately 6°. Thus from all directions of azimuth about the aircraft axis one or more of the navigational lights will be visible provided only that the observation time exceeds the period of the oscillations of the light source. The lights are driven by a motor and gear system which produce complete oscillations approximately 48 times each minute. The unique reflector system provides forward illumination from the two wing lights through an angle of about 80° centered on the longitudinal aircraft axis while the tail light provides illumination of substantial intensity to an angle of 40° above the aircraft axis and 70° below the aircraft axis. Special devices are provided for automatically dimming the lights under certain predetermined conditions. It should be noted that the various angles are subject to variations depending upon the specific requirements of a situation, tolerances, light sources and the like. The stated angles throughout this specification are for purposes of illustration and can be varied to satisfy particular situations.

For a more complete understanding of this invention reference will now be made to the accompanying drawings wherein.

Figure 1:
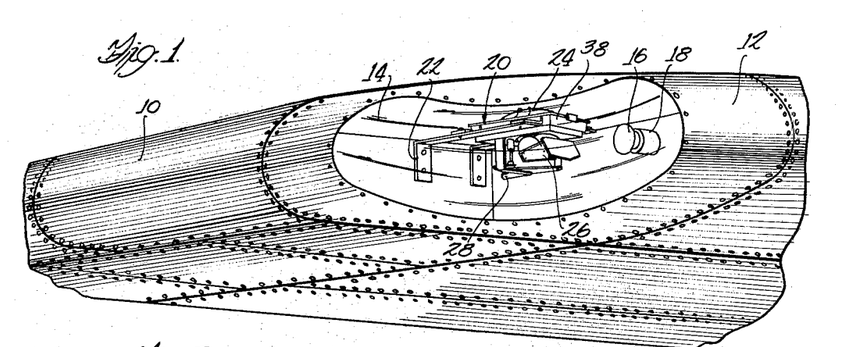
FIG. 1 is a general view of a wing tip fragment showing one lighting unit of the lighting system disposed therein.

Referring now to the drawings and more particularly to FIG. 1 a right wing tip 10 of any conventional aircraft is shown in fragmentary form with an apparent opening at the outer end of the leading edge 12. The opening is actually closed by a transparent plastic canopy 14 which protects the internal mechanism while efficiently transmitting light. A small auxiliary steadily burning light 16 is disposed in a socket 18 secured to a wing partition and the lighting unit 20 of this invention is mounted on appropriate brackets 22 and suspended from a longitudinal wing section. The lighting unit 20 includes a sealed beam source 24 directing a concentrated beam of light downwardly onto a reflector assembly 26. Reflector assembly 26 is driven by a small motor through speed reducing gears and an eccentric assembly 28. If desired the light source 24 may also be secured to the reflector assembly 26 and oscillate therewith. The illustrated light is mounted in the right-hand wing and an identical device is mounted in the left-hand wing, although as is conventional for navigation lighting systems the starboard light includes a green filter and the port light is covered by a red filter. This is accomplished by merely securing the desired filter over the sealed beam unit. An identical light unit 20 is secured in the tail assembly for oscillation about the longitudinal axis of the aircraft and this tail unit transmits white or unfiltered light.

Figure 2:
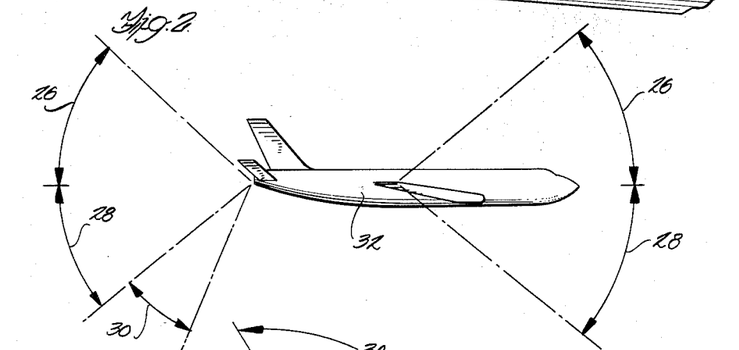
FIG. 2 is a diagrammatic side view of an aircraft showing light distribution about the longitudinal axis provided by one lighting system constructed in accordance with this invention.

FIG. 2 illustrates the vertical dispersion of light from the light units such as light unit 20. The light unit in each wing tip has a reflector arrangement especially designed to transmit light in a beam having a horizontal width of only about 6–8° with a vertical spread through the angle 26 of approximately 40° above the aircraft axis and the angle 28 of approximately 40° below the aircraft axis. The tail light has a slightly different reflector configuration whereby the beam is approximately 8° in horizontal width and has a vertical beam spread through angle 26 of 40° above the aircraft axis as well as the spread through angle 28 of 40° below the axis. Light distribution through an additional arc of 25° is provided downwardly as indicated by segment 30 to supplement the normal vertical distribution and provide greater warning for aircraft approaching from behind and below aircraft equipped with the instant invention.

Figure 3:
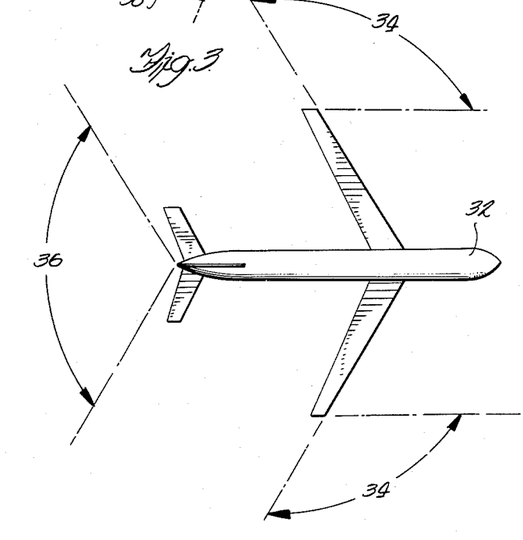
FIG. 3 is a diagrammatic top plan view of an aircraft showing the light distribution in azimuth about the vertical aircraft axis.

As shown in FIG. 3 the lights in each of the wing tips of aircraft 32 oscillate through an angle of approximately 110° and with the design spread of approximately 6° in beam width the oscillating beam fills the angle 34 of approximately 116° with an overlap of 3° on each side of the aircraft axis. The beam width 36 provided by the oscillating tail light fills an angle of approximately 146° centered on the aircraft axis whereby a 6° overlap with each of the wing light distribution patterns 34 is provided.

The details of the light unit of this invention as characterized by light unit 20 will be clear from FIGS. 4-7. The light unit 20 is assembled on a rigid frame 38 which is in turn secured to brackets 22 and wing 10 in FIG. 1. The light unit includes the basic elements of a sealed beam light source 24, a reflector assembly 26, a motor 40 and a drive assembly 28. Sealed beam unit 24 has its lens 42 located generally horizontally whereby a beam of light having approximately a 6° beam spread is transmitted vertically from the parabolic reflector integrally formed at the rear wall of the sealed beam unit. The sealed beam unit is a conventional device having a filament and a cap forwardly of the filament whereby all light is transmitted rearwardly against the sealed beam reflector for maximum collimating qualities.

While many units may be employed for this purpose it has been found that a 100 watt, 6 volt unit is especially adaptable. A 6 volt unit is preferred as the low voltage filament has substantially greater cross section and consequently withstands shock and vibration far better than a high voltage unit. The light unit 20 is preferably energized from a 115 volt, 400 cycle A.C. source as is conventionally available in aircraft. Through a circuit to be described with respect to FIG. 8 the motor 40 is directly energized from the A.C. source and the light source 24 is energized through a step-down transformer 42 which is connected as an autotransformer and has two input taps which are selectively engaged by a relay 44.

A capacitor 46 is provided for synchronous motor operation. The output shaft of motor 40 enters a housing 48 where it is connected to a worm gear, not shown, to reduce the speed of the motor to produce the desired speed in output shaft 50.

A small contactor, not shown in FIGS. 4-7, is also enclosed in housing 48 and is momentarily actuated for each rotation of output shaft 50. Shaft 50 is supported in bearing 52 and is connected to eccentric arm 54 shown best in FIG. 5. Arm 54 is in turn pivotally connected by pin 56 to an offset drive arm 58. Drive arm 58 is pivotally connected by pin 60 to a rotatably mounted disc 62 to which is riveted a fiber gear segment 64. The offset in arm 58 provides clearance for a bearing hub 63 which rotatably supports disc 62 in a base 76. Base 76 extends downwardly from frame 38 and is supported by a pair of side channels 67. Gear segment 64 engages a corresponding gear segment 66 which is secured to the reflector assembly 26 and rotatable therewith. Reflector assembly 26 and gear segment 66 are secured together by a small bracket 74 which is in turn secured to a cylindrical bearing 72. Bearing 72 is rotatably mounted in base 76.

Operation of motor 40 continuously rotates shaft 50 and arm 54 to reciprocate offset arm 58. This, in turn, causes disc 62 and segment 64 to oscillate driving gear segment 66 and consequently reflector assembly 26 first in a clockwise direction in FIG. 5 to the position shown as broken lines 68 and then in a counterclockwise direction to a position shown by broken lines 70. The total swing to the two extreme positions 68 and 70 is approximately 110°.

Reflector assembly 26 is secured to bracket 74 and in turn to bearing 72. A large reflector 84 is secured to bracket 74 and two generally parallel end plates 78 and 80 extend upwardly from reflector 84 to support a smaller reflector 82. Reflectors 82 and 84 are uniquely shaped and spaced to produce the light pattern already described and illustrated in FIGS. 3 and 4. Mirrors 82 and 84 have generally cylindrical configurations with a common directrix normal to the beam axis of sealed beam source 24 whereby the horizontal beam width reflected by the mirrors is substantially identical to the beam width of the light source and in the described embodiment between 6 and 8°. The vertical pattern of light is determined by the shape of the two cylindrical reflectors and can be selected to fit specific requirements.

In the preferred embodiment disclosed and described herein a small reflector 82 extends from a line closely adjacent the center of the sealed beam source 24 outwardly and forwardly toward a line lying in a plane parallel to the beam axis and including the forward edge of the light source 24. The rearward portion 86 of small reflector 82 is disposed at substantially 45° to the beam axis of light source 24 whereby it transmits a parallel beam of light the width of the light source normal to the light source axis, as indicated by arrow 88. The outward and forward incremental portion 90 of small reflector 82 is disposed at approximately 25° to the light source axis whereby light reflected therefrom is projected along arrow 92 upwardly at an angle of about 40° to the axis of the reflected pattern. The shape in the intermediate portion of the small reflector 82 is determined by the designer to produce any desired pattern of light intensity within the 40° arc. Thus, if the shape of the small reflector 82 is uniformly varying from the point 86 to the forward point 90, that is if it is a segment of a right circular cylinder the light distribution would be uniform and because of the smaller amount of light radiating from the periphery of light source 24, greater intensity would be produced along the horizontal pattern axis indicated by broken arrow 88 with minimum intensity upwardly at 40° as indicated by broken arrow 92. Obviously, the reflector contour can be varied to produce increased intensity in any portion of the beam and the beam may be widened or narrowed from the particular pattern described herein.

The larger rearward reflector 84 is shaped such that the upper portion 94 forms an angle of incidence of approximately 65° to the axis of source 24 whereby light reflected from an incremental portion of the reflector along the line 94 is transmitted downwardly along broken arrow 96 to define the lower extreme of beam spread in the wing tip lights. The lower edge 98 of large reflector 84 is disposed at substantial 45° to the axis of light source 24 whereby light reflected thereby is transmitted substantially normal to the light source beam axis along broken arrow 100 and substantially parallel to the light reflected by the upper portion 86 of small reflector section 82 along broken line 88. If desired, the reflectors may be so shaped that beam axes 88 and 100 converge slightly, although natural dispersion and refraction will avoid a dark center cone even though beam axes 88 and 100 are prefectly parallel.

In the design of the light unit for use in the tail of aircraft greater downward vertical beam width is desired to reduce any hazard of collision with overtaking aircraft which approach from behind and below the aircraft utilizing the instant invention. For this purpose it is advantageous to secure a small auxiliary reflector 102 on the back side of small reflector 82 and to slightly alter the shape of large reflector 84, if desired, to apply greater light to the auxiliary reflector 102. To this end a small section 104 of large reflector 84 may be maintained at substantially 45° to transmit horizontal light against auxiliary reflector 102. Light transmitted by source 24 will strike central segment 104 of large reflector 84 and reflect light against auxiliary mirror 102 to form a downwardly directed beam between the broken arrows 106 and 108. This beam will fill an area vertically below the beam of large reflector 84 forming an angle below the horizontal of about 70° and thus a total vertical beam width of about 110°.

Figure 4:
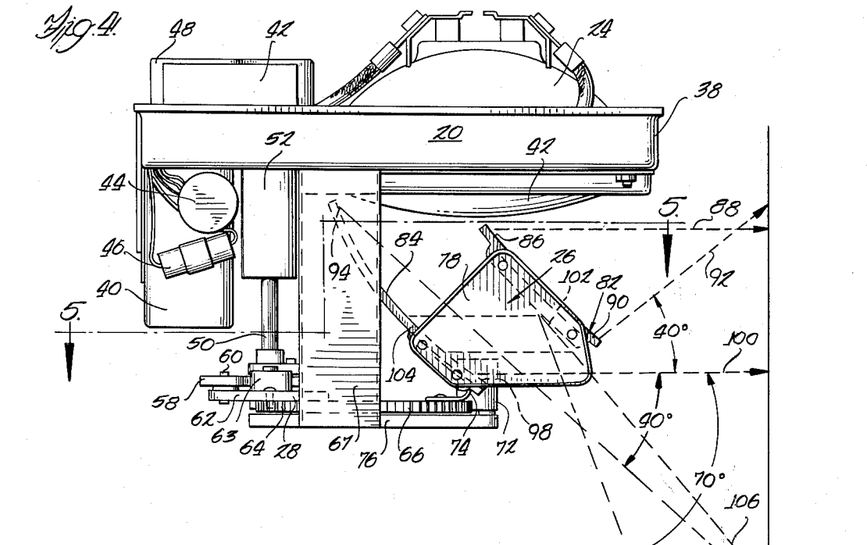
FIG. 4 is a side elevational view of one lighting unit forming a part of the described embodiment of this invention with light beam characteristics developed thereon.
Figure 5:
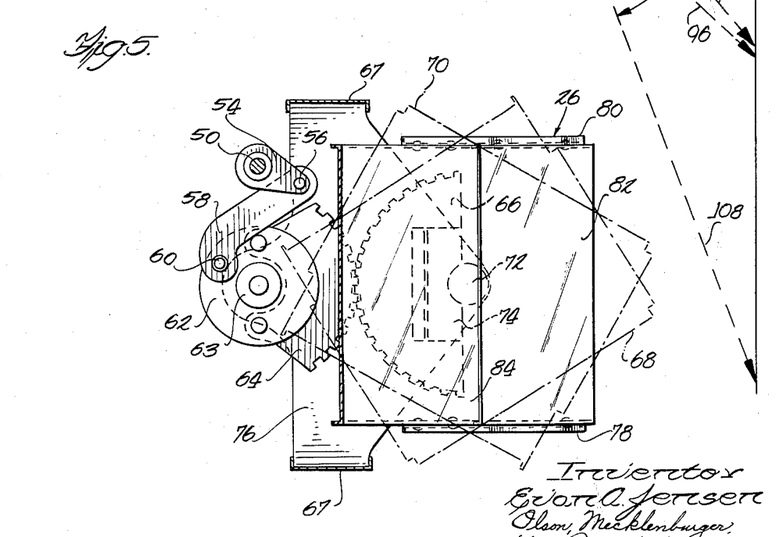
FIG. 5 is a sectional view showing the reflector system taken on the line 5—5 of FIG. 4.
Figure 6:
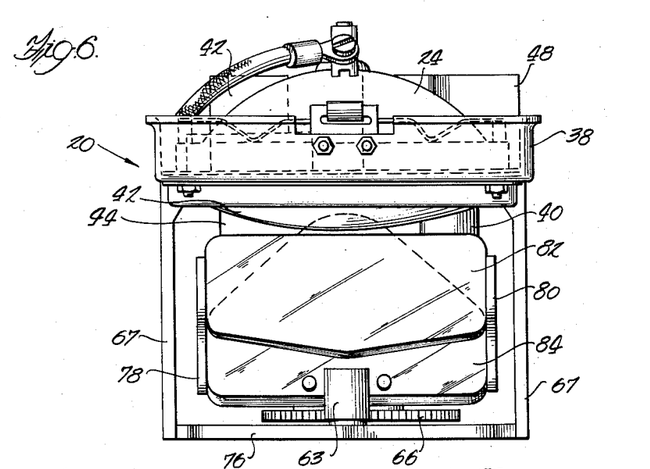
FIG. 6 is a front elevational view of the embodiment of FIG. 4.
Figure 7:
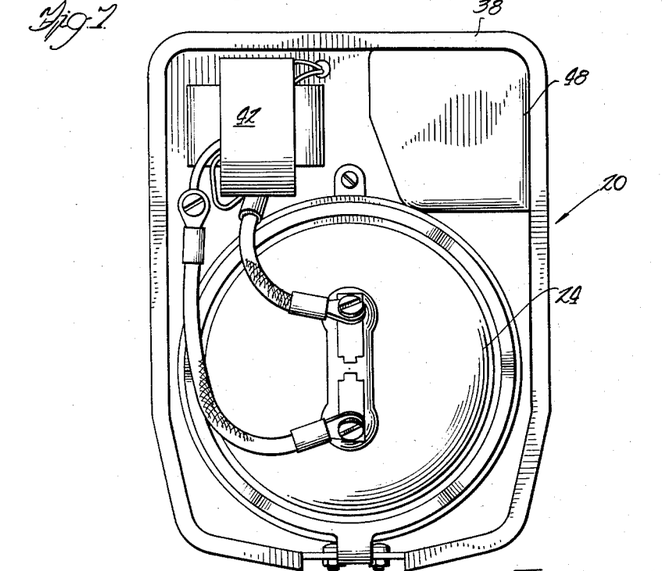
FIG. 7 is a top plan view of the embodiment of FIG. 4.

As will be apparent from the beam diagram of FIG. 4 the unique shape of the mirror 26 enables very substantial compaction of the light unit 20. This results in part from the disposition of small reflector 82 from what might be considered its normal position conforming with and below large reflector 84 to a position aligned with the large reflector along the pattern axis. This greatly reduces the vertical dimensions of the light unit. However the advantages obtained by the instant invention greatly exceed this vertical reduction in size. As a result of the particular relationship of the beams produced by the various reflectors virtual light sources are created which are forwardly of the actual source and forwardly of the reflectors whereby very large vertical beam width can be obtained through a relatively small transparent opening 14 in a wing tip 12. This is possible while positioning the actual light unit in a practicable location set relatively deeply in the wing and behind the virtual beam center. The virtual light source are the points where beams actually cross as shown in FIG. 4 and these determine th econes of transparency required in the wing sections or tail section. Other systems would require larger cones of transparency with the virtual light sources set inwardly with respect to the light unit and consequently greater expense and structural weakness.

Figure 8:
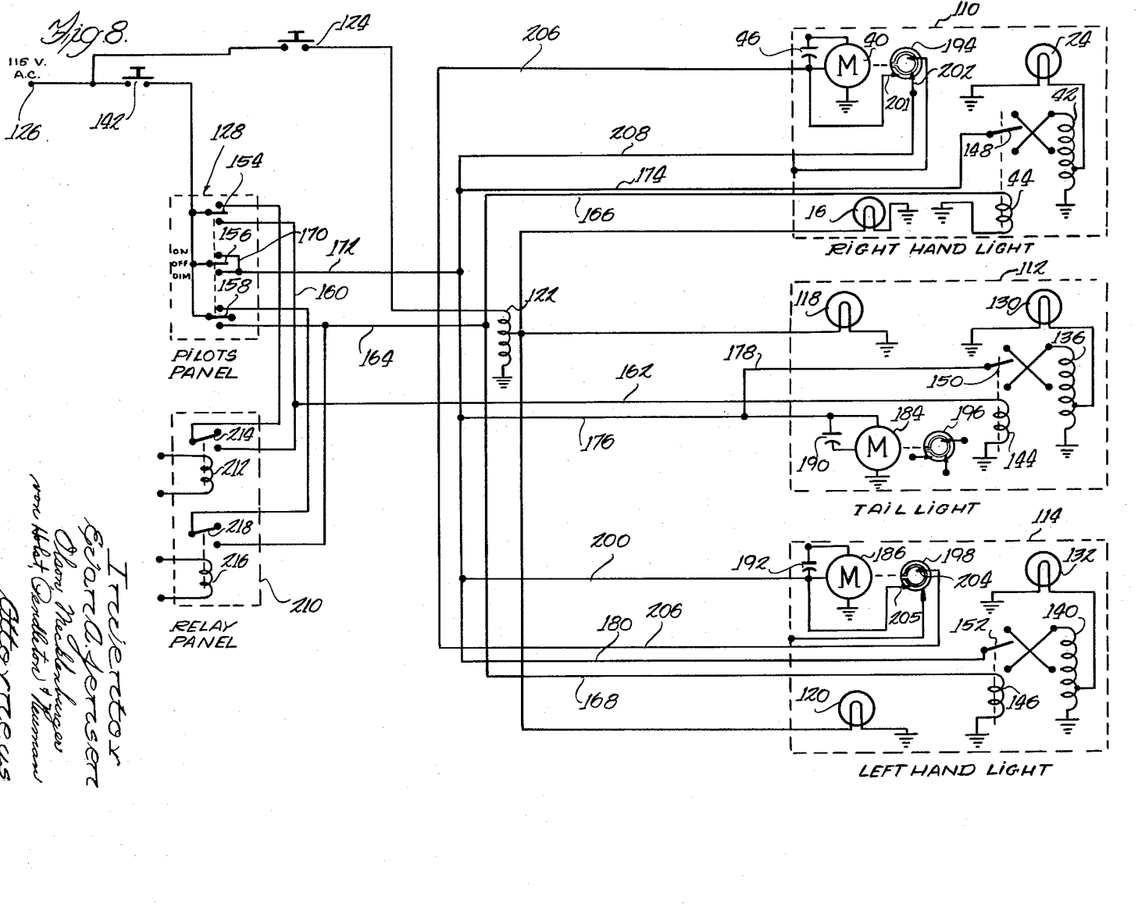
FIG. 8 is a schematic circuit diagram of the high intensity navigation lighting system of this invention.

Referring now to the circuit diagram of FIG. 8, the right-hand light assembly, the tail light assembly, and left hand light assembly are shown enclosed in broken boxes 110, 112 and 114. The enclosed elements are actually disposed in their respective positions in the wings and tail. Each includes an auxiliary light 16, 118 and 120, all of which are connected to a common step-down transformer 122. Auxiliary light 16, 118 and 120 are energized by the closure of a circuit breaker 124 and are usually automatically energized from a 115 volt, 400 cycle terminal 126 whenever the aircraft electric system is energized. In addition to the auxiliary lights, high intensity sealed beam units 24, 130 and 132 are also respectively located in the right-hand, tail and left-hand positions. As already described, for reliability and vibration resistance 6 volt filaments are employed in lights 24, 130 and 132 and these are energized from step down autotransformers 42, 136 and 140. Because of the very high intensity of the sealed beam units it is desirable that the lights be dimmed under certain conditions and for this purpose dimming relays 44, 144 and 146 are provided which actuate respective single pole double throw contacts 148, 150 and 152. In the normal or deactuated position the upper contacts of relay contacts 148, 150 and 152 are closed providing full energization of the filaments of seal beam units 24, 130 and 132. Upon actuation of relay coils 44, 144 and 146 the lower normally open contacts are closed providing a larger primary winding in the transformers 42, 136 and 140 and consequently reduced voltage on sealed beam lights 24, 130 and 132.

A main control switch 128 is provided on the pilot's panel having three positions. The center position is an "off" position in which all but the low intensity standby lights 16, 118 and 120 are deenergized. The upper position is an "on" position for normal operation and a "dim" condition is established when the switch is thrust downwardly. This is completely independent of the auxiliary light control 124 already described. In either the downward "dim" position or the "on" position a circuit is completed from the 115 volt A.C. source 126 through a circuit breaker 142 to the movable switch blades of three separate switches 154, 156 and 158 on pilot panel 128. In the downward or "dim" position one circuit is completed through tail dimming switch 154, conductor 160, and conductor 162 to tail light dimming relay 154 so that switch 150 is actuated applying reduced voltage to source 130. Similarly wing dimming switch 158 is in the downward position closing a circuit through that switch, conductor 164 and conductor 166 to right-hand dimmer relay 44 to provide reduced energization of light 24 and from switch 158 through conductor 164 and conductor 168 to left dimmer relay 146 to produce reduced output in left hand source 132.

The operation of switch 156 on pilot's panel 128 is the same for both the "on" and "dim" positions as the two switch terminals are tied together with strap 170. In either position energy for right-hand light 24 is provided from switch 156 through conductors 172 and 174 to dimmer relay contacts 148. Energy for tail light 130 is provided from switch 156 through conductor 172 and conductors 176 and 178 to dimmer relay contacts 150 and energy for left-hand light 132 is provided from switch 156 through conductor 172 and conductor 180 to dimmer relay contacts 152. Center switch 156 also energizes the three drive motors 40, 184 and 186. The drive motors are conventional synchronous hysteresis motors employing phase shifting capacitors 46, 190 and 192. In the particular embodiment small one phase motors are employed having a synchronous shaft speed of 12,000 r.p.m. As already discussed, this speed is reduced in gear reduction means contained in housing 48 to produce an output shaft speed of 48 r.p.m. The output shaft drives the reflector assembly 26 and also drives small commutators 194, 196 and 198 contained in the gear housing. Each of the light units is made identically for greatest flexibility, ease of maintenance, low cost and minimum replacement inventory. However in the tail light assembly 112 switch 196 performs no function and motor 184 is directly energized without concern for synchronization. Tail light motor 184 is directly energized from the A.C. source 126 through switch 156 and conductors 172 and 176.

In the particular embodiment described left-hand light assembly 114 is considered a master light and it is also continuously energized from A.C. source 126 through switch 156, conductor 172, and conductor 200. However, it has been found that for maximum utilization of the visual information available from the wing tip lights, it is important that the two lights travel in synchronization whereby a pilot in an oncoming aircraft will momentarily see both lights at high intensity at the same time. Because of the high speed of the motors 40, 184 and 186 and the substantial gear reduction, synchronization of the motors does not insure synchronization of the sweeping reflector assemblies. To positively assure synchronized operation of the wing units, right-hand unit 110 is operated as a slave unit and in the event that the two lights are not in phase synchronization the slave unit will be momentarily interrupted once in each cycle for a short period until synchronization is attained. To accomplish this commutator 194 on the output shaft of the motor and gears momentarily closes a circuit between contacts 201 and 202 once during each cycle while commutator 198 in left-hand unit 114 momentarily opens a circuit between contacts 204 and 205 once during each cycle. If the two lights are not synchronized, opening of left-hand contacts 204 and 205 will break the circuit for motor 40 which is from A.C. source 126 through switch 156, conductor 172, conductor 200, left hand contacts 204 and 205, and conductor 206, thus momentarily deenergizing right-hand motor 40 so that it will be delayed momentarily and approach phase syncronization with left-hand unit 114. When synchronization is attained, right-hand contacts 201 and 202 will be closed at the same instant that left-hand contacts 204 and 205 are opened, maintaining continuous energization of motor 40 from A.C. source 126 through switch 156, conductor 172, conductor 208 and contacts 201 and 202.

As the illumination provided by the light system of this invention is intense it is desirable to insure dimming of the lights when an aircraft is in a traffic pattern or on the ground. Thus when pilot switch 128 is in the "on" position relay panel 210 is rendered effective. Relay panel 210 includes two relays, relay coil 212 which controls normally open contacts 214 is energized by a switch on the landing gear handle so that whenever the landing gear handle is actuated to extend the gear a switch is closed and relay 212 is energized closing contacts 214. A second coil 216 is connected to a switch on the landing gear strut which is automatically closed whenever the aircraft is resting on the ground compressing the landing gear. Thus contacts 218 are closed in response to energization of coil 216 whenever the aircraft is on the ground. When switch 128 is in the "on" position and relay 212 is energized a circuit is completed from 115 volt terminal 126 through circuit breaker 142 and switch 154 to relay contacts 214 and in turn through conductor 162 to tail light dimming relay 144. Thus whenever the landing gear actuating handle is operated to extend the gear, tail light dimming relay 144 is energized applying reduced voltage to tail light 130. Similarly whenever the aircraft is on the ground a circuit is completed from terminal 126 through circuit breaker 152, the upper contact of switch 158, contacts 218, conductors 164 and 166 to right-hand dimming relay 44 and through conductors 164 and 168 to left-hand dimming relay 146 to reduce the intensity of both wing tip lights.

With the lighting system described above it has been found that aircraft can be observed as they approach one another in the range of 35 miles under conditions of medium or light overcast. It has also been found that the intensity of the tail light is sufficient to illuminate the inside of a cockpit of an aircraft approaching the tail light at a distance as great as 500 feet and is of course highly noticeable at much greater distance in the order of 35 miles.

Another important aspect of the instant system is the fact that a crew operating an aircraft having the subject lighting system are actually aware of an aircraft approaching from behind. Light reflected from the tail unit of the instant invention by an overtaking aircraft is visible in the cockpit of the aircraft bearing the instant lighting system. Thus the pilot is aware of overtaking aircraft even when they cannot be seen. By synchronizing the wing light operation it has been found that crew members of an aircraft have been better able to judge the spacing between the lights and thus the distance between two approaching aircraft.

It will be apparent from the foregoing description that the particular configuration and light unit have great utility apart from the entire system as shown and described herein and it is equally apparent that the system with its safety features and various attributes has various substantial utility apart from the particular lighting unit, although the various concepts and combinations cooperate to create a total system of unusual versatility, utility and ingenuity.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A lighting system for aircraft having retractable landing gear, said system comprising a high intensity tail light unit and a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence in the order of 65° and the portion adjacent said center having an angle of incidence less than that of the aforementioned portion and in the order of 45°, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section, said first reflector means having a reflective rearward surface which receives reflected light from said second section and reflects light therefrom with an effective angle of incidence less than that of said second section, and means oscillating said reflector means through an angle of at least 120° about an axis generally parallel to said beam, means synchronizing the oscillations of said two wing light units whereby said units move toward and away from the longitudinal axis of such an aircraft in synchronism, means automatically dimming said wing light units whenever such landing gear are supporting said aircraft, means dimming said tail light unit whenever said landing gear are extended, steady low intensity light elements at said tail, right wing and left wing, and transparent covers conforming to said aircraft and enclosing said light units and said light elements.

2. A lighting system for aircraft having retractable landing gear, said system comprising a high intensity tail light unit and a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section, said first reflector means having a reflective rearward surface which receives reflected light from said second section and reflects light therefrom with an effective angle of incidence less than that of said second section, and means oscillating said reflector means through a substantial angle about an axis generally parallel to said beam, means synchronizing the oscillations of said two wing light units whereby said units move toward and away from the longitudinal axis of such an aircraft in synchronism, means automatically dimming said wing light units whenever such landing gear are supporting said aircraft, means dimming said tail light unit whenever said landing gear are extended, steady low intensity light elements at said tail, right wing and left wing, and transparent covers conforming to said aircraft and enclosing said light units and said light elements.

3. A lighting system for aircraft having retractable landing gear, said system comprising a high intensity tail light unit and a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section, and means oscillating said reflector means through a substantial angle about an axis generally parallel to said beam, means synchronizing the oscillations of said two wing light units whereby said units move toward and away from the longitudinal axis of such an aircraft in synchronism, means automatically dimming said wing light units whenever such landing gear are supporting said aircraft, means dimming said tail light unit whenever said landing gear are extended, steady low intensity light elements at said tail, right wing and left wing, and transparent covers conforming to said aircraft and enclosing said light units and said light elements.

4. A lighting system for aircraft having retractable landing gear, said system comprising a high intensity tail light unit and a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section, and means oscillating said reflector means through a substantial angle about an axis generally parallel to said beam, means synchronizing the oscillations of said two wing light units whereby said units move toward and away from the longitudinal axis of such an aircraft in synchronism, means automatically dimming said wing light units whenever such landing gear are supporting said aircraft, and means dimming said tail light unit whenever said landing gear are extended.

5. A lighting system for aircraft having retractable landing gear, said system comprising a high intensity tail light unit and a right wing and a left wing light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section, and means moving said reflector means through a substantial angle about an axis generally parallel to said beam, means synchronizing the movements of said two wing light units whereby said units move toward the longitudinal axis of such an aircraft in synchronism, means automatically dimming said wing light units whenever such landing gear are supporting said aircraft, and means dimming said tail light unit whenever said landing gear are extended.

6. A lighting system for aircraft having retractable landing gear, said system comprising a high intensity tail light unit and a right wing and a left wing light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, a portion of said first section having an angle of incidence greater than 45° and a portion having an angle of incidence less than that of the aforementioned portion, said second section extending outwardly and forwardly from a line adjacent the rearward periphery of said light source, a portion of said second section having an angle of incidence less than 45° and a portion thereof having an angle of incidence greater than the angle of incidence of the aforementioned portion of the second section, and means moving said reflector means through a substantial angle about an axis generally parallel to said beam, means synchronizing the movement of said two wing light units whereby said units move toward the longitudinal axis of such an aircraft in synchronism, means automatically dimming said wing light units whenever such landing gear are supporting said aircraft, and means dimming said tail light unit whenever said landing gear are extended.

7. A lighting system for aircraft having retractable landing gear, said system comprising a high intensity tail light unit and a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having reflector surfaces of generally cylindrical shape having a directrix generally normal to said beam, said surfaces being so shaped that a fan-like pattern of light is reflected transversely to said beam, and means moving said reflector means through a substantial angle about an axis generally parallel to said beam, means synchronizing the oscillations of said two wing light units whereby said units move toward the longitudinal axis of such an aircraft in synchronism, means automatically dimming said wing light units whenever such landing gear are supporting said aircraft, and means dimming said tail light unit whenever said landing gear are extended.

8. A lighting system for aircraft having retractable landing gear, said system comprising a high intensity tail light unit and a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having reflector surfaces of generally cylindrical shape having a directrix generally normal to said beam, said surfaces being so shaped that a fan-like pattern of light is reflected transversely to said beam, and means moving said reflector means through a substantial angle about an axis generally parallel to said beam, means automatically dimming said wing light units whenever such landing gear are supporting said aircraft, and means dimming said tail light unit whenever said landing gear are extended.

9. A lighting system for aircraft, said system comprising a right wing and a left wing high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having reflector surfaces of generally cylindrical shape having a directrix generally normal to said beam, said surfaces being so shaped that a fan-like pattern of light is reflected transversely to said beam, and means moving said reflector means through a substantial angle about an axis generally parallel to said beam, and means synchronizing the oscillations of said two wing light units whereby said units move toward the longitudinal axis of such an aircraft in synchronism.

10. A lighting system for vehicles, said system comprising a right side and a left side high intensity light unit, each of said light units comprising a high intensity light source, light collimating means directly associated with said light source for forming a beam of generally parallel light rays, reflector means in the path of said beam for reflecting light in a predetermined pattern generally transverse to said beam, said reflector means having reflector surfaces of generally cylindrical shape having a directrix generally normal to said beam, said surfaces being so shaped that a fan-like pattern of light is reflected transversely to said beam, and means moving said reflector means through a substantial angle about an axis generally parallel to said beam, and means synchronizing the oscillations of said two light units whereby said units move toward the longitudinal axis of such a vehicle in synchronism.

11. A lighting unit comprising a high intensity light source, light collimating means directly associated with said light source for forming a beam of generally parallel light rays, reflector means in the path of said beam for reflecting light in a predetermined pattern generally transverse to said beam, said reflector means having at least a forward and a rearward reflective surface of generally cylindrical shape having a single directrix generally normal to said beam, said surfaces being so shaped that a forwardly directed fan-like pattern of light is reflected transversely to said beam and said surfaces being so shaped and aligned that the rearward surface reflects light forwardly adjacent said forward reflective surface.

12. A lighting unit comprising a high intensity light source, light collimating means directly associated with said light source for forming a beam of generally parallel light rays, and reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, said second section extending outwardly and forwardly from a line adjacent the rearward periphery of said light source to a line disposed substantially outwardly from the center of said source, said first and second sections having reflective surfaces adapted to reflect a single forwardly directed pattern.

13. The lighting unit of claim 12 wherein said pattern has a fan-like shape, the central plane of which includes said beam.

14. The lighting unit of claim 12 wherein said first section reflects a fan-like pattern forwardly and angularly toward said source and said second section reflects a fan-like pattern forwardly and angularly away from said source, said patterns forming one continuous fan-like pattern.

15. A lighting unit comprising a high intensity light source, light collimating means, means directly associated with said light source for forming a beam of generally parallel light rays, and reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, a portion of said first section having an angle of incidence in the order of 65° and a portion having an angle of incidence less than that of the aforementioned portion and in the order of 45°, said second section extending outwardly and forwardly from a line adjacent the rearward periphery of said light source, a portion of said second section having an angle of incidence in the order of 25° and a portion thereof having an angle of incidence greater than the angle of incidence of the aforementioned portion of the second section and in the order of 45°.

16. A lighting unit comprising a high intensity light source, light collimating means, means directly associated with said light source for forming a beam of generally parallel light rays, and reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion and in the order of 45°, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section and in the order of 45°.

17. A lighting unit comprising a high intensity light source, light collimating means, means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion and in the order of 45°, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section and in the order of 45°, and means oscillating said reflector means through an angle of at least 120° about an axis generally parallel to said beam.

18. A lighting unit comprising a high intensity light source, light collimating means, means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence greater than 45° and the portion adjacent said center having an angle of incidence less than that of the aforementioned portion and in the order of 45°, said second section extending outwardly and forwardly from a line adjacent the rearward periphery of said light source, the portion of said second section adjacent the light source having an angle of incidence less than 45° and the outward portion thereof having an angle of incidence greater than the angle of incidence of the aforementioned portion of the second section and in the order of 45°, said first reflector means having a reflective rearward surface which receives light reflected from said second section and reflects light therefrom with an effective angle of incidence less than that of said second section, and means oscillating said reflector means through an angle of at least 120° about an axis generally parallel to said beam.

19. A lighting unit comprising a high intensity light source, light collimating means, means directly associated with said light source for forming a beam of generally parallel light rays, reflector means in the path of said beam for reflecting light in a predetermined pattern generally transverse to said beam, said reflector means having at least a first and a second section each of generally cylindrical shape having a directrix generally normal to said beam, said first section extending outwardly and forwardly from a line adjacent the center of said light source to a line substantially spaced outwardly from the forward periphery of said light source, the portion of said first section spaced outwardly from the forward periphery having an angle of incidence in the order of 65° and the portion adjacent said center having an angle of incidence less than that of the aforementioned portion and in the order of 45°, said second section extending outwardly and forwardly from a line adjacent the rearward periphery of said light source, the portion of said second section adjacent the light source having an angle of incidence in the order of 25° and the outward portion thereof having an angle of incidence greater than the angle of incidence of the aforementioned portion of the second section and in the order of 45°, said first reflector means having a reflective rearward surface which receives light reflected from said second section and reflects light therefrom with an effective angle of incidence less than that of said second section, and means oscillating said reflector means through an angle of at least 120° about an axis generally parallel to said beam.

No references cited.